(12) United States Patent
Dias et al.

(10) Patent No.: US 7,539,259 B2
(45) Date of Patent: May 26, 2009

(54) OFDM CHANNEL ESTIMATION AND TRACKING FOR MULTIPLE TRANSMIT ANTENNAS

(75) Inventors: Alexandre Ribeiro Dias, Toulouse (FR); Marc Bernard De Courville, Paris (FR); Markus D. Muck, Paris (FR)

(73) Assignee: Motorola, Inc., Schaumburg, IL (US)

( * ) Notice: Subject to any disclaimer, the term of this patent is extended or adjusted under 35 U.S.C. 154(b) by 604 days.

(21) Appl. No.: 10/566,932
(22) PCT Filed: Jul. 28, 2004
(86) PCT No.: PCT/EP2004/051643

§ 371 (c)(1),
(2), (4) Date: Feb. 2, 2006

(87) PCT Pub. No.: WO2005/022815

PCT Pub. Date: Mar. 10, 2005

(65) Prior Publication Data

US 2008/0043857 A1 Feb. 21, 2008

(30) Foreign Application Priority Data

Aug. 28, 2003 (EP) ................. 03292120

(51) Int. Cl.
*H04B 7/02* (2006.01)
*H04L 1/02* (2006.01)
(52) U.S. Cl. .................... 375/267; 375/260
(58) Field of Classification Search ......... 375/259–261, 375/267, 271, 285, 295–296, 299, 365–368
See application file for complete search history.

(56) References Cited

U.S. PATENT DOCUMENTS 7,072,289 B1 * 7/2006 Yang et al. ............... 370/208

(Continued)

FOREIGN PATENT DOCUMENTS

WO  WO 02/45329  6/2002

OTHER PUBLICATIONS

Bertrand Muquet et al., OFDM Trailing Zeros Versus OFDM With Cyclic Prefix; Links, Comparisons and Application to the Hiperlan/2 System, XP-002231869, IEEE, 2000, pp. 1049-1053.

(Continued)

*Primary Examiner*—Shuwang Liu
*Assistant Examiner*—James M Perez (57) ABSTRACT

Multiple Transmit Multiple Receive Orthogonal Frequency Division Multiplexing ('OFDM') comprising generating bit streams and corresponding sets of N frequency domain carrier amplitudes ($\tilde{s}(kN+j)$, $0 \leq j \leq N-1$) modulated as OFDM symbols subsequently to be transmitted from a transmitter, where k is the OFDM symbol number and j indicates the corresponding OFDM carrier number. Affix information is inserted at the transmitter into guard intervals between consecutive time domain OFDM symbols and are used at the receiver to estimate the Channel Impulse Response ($H_{lm}$) of the transmission channels, the estimated Channel Impulse Response ($\hat{H}_{lm}$) being used to demodulate the bit streams in the signals received at the receiver. The affix information is known to the receiver, as well as to the transmitter, and is mathematically equivalent to a vector ($c_D$) that is common to the time domain OFDM symbols multiplied by at least first weighting factors ($\alpha_k$) that are different for one time domain OFDM symbol (k) than for another and second weighting factors ($w_i(k)$) that enable one of the transmit antenna means (i) to be distinguished from another.

13 Claims, 2 Drawing Sheets

U.S. PATENT DOCUMENTS

2002/0041635 A1* 4/2002 Ma et al. .................... 375/267
2002/0118771 A1* 8/2002 Larsson ...................... 375/267
2003/0039322 A1* 2/2003 Murakami et al. .......... 375/329

OTHER PUBLICATIONS

Luc Deneire, et al., "Training Sequence Versus Cyclic Prefix—A New Look On Single Carrier Communication," XP-001103154, IEEE Communications Letters, vol. 5, No. 7, Jul. 2001, pp. 292-294.

* cited by examiner

OFDM CHANNEL ESTIMATION AND TRACKING FOR MULTIPLE TRANSMIT ANTENNAS

FIELD OF THE INVENTION

This invention relates to communication using Orthogonal Frequency Division Multiplexing ('OFDM') and, more particularly, to channel estimation and tracking in OFDM communication.

BACKGROUND OF THE INVENTION

This invention relates to communication using Orthogonal Frequency Division Multiplexing ('OFDM') and, more particularly, to channel estimation and tracking in OFDM communication.

BACKGROUND OF THE INVENTION

OFDM communication has been chosen for most of the modern high-data rate communication systems (Digital Audio Broadcast—DAB, Terrestrial Digital Video Broadcast—DVB-T, and Broadband Radio Access Networks—BRAN such as HIPERLAN/2, IEEE802.11a/g, IEEE802.15.3a, for example, and is considered for future wide-band telephony standards, referred to as "4G"). However, in most cases the receiver needs an accurate estimate of the channel impulse response. Also, in the context of wireless local area networks ('WLANs'), current data rates (54 Mbps on top of the physical layer) are foreseen to be insufficient for very dense urban deployment, such as for hot spot coverage. This is the motivation for IEEE to propose and specify in the scope of the IEEE802.11n (the former High Throughput Study Group) solutions for very high data rate WLANs (targeting at least 100 Mbps on top of the medium access control ('MAC') layer) in the 5 GHz band. Another area of investigation is that of higher frequency bands where more spectrum is available such as the 60 GHz band.

One way of achieving higher data rates is to provide the system with multiple antennas both at the transmitter and at the receiver. By doing so, it is possible to increase the quality of the communication link by exploiting the spatial diversity dimension using for instance Space Time Block Codes ('STBC'), or to increase the spectral efficiency of the system by transmitting simultaneously different streams using Spatial Division Multiplexing. Therefore, Multiple Transmit Multiple Receive (MTMR) antenna systems are strong candidates for next generation WLANs and certain other OFDM communication systems.

In the so-called Cyclic Prefix OFDM (CP-OFDM) modulation scheme, each OFDM symbol is preceded by a guard interval that is longer than the channel impulse response (CIR) and a cyclic prefix or postfix, hereinafter referred to collectively as a cyclic affix, is inserted at the transmitter in a guard interval between consecutive OFDM symbols, the cyclic affix consisting of samples circularly replicated from the useful OFDM symbol time domain samples. The cyclic affix enables very simple calculation for the equalisation at the receiver, where the cyclic affix is discarded and each truncated block is processed, for example using Fourier Transform (usually Fast Fourier Transform (FFT)), to convert the frequency-selective channel output into parallel flat-faded independent sub-channel outputs, each corresponding to a respective sub-carrier. For equalisation purposes, numerous strategies exist. Following the zero forcing approach, for example, each sub-channel output is, unless it is zero, divided by the estimated channel coefficient of the corresponding sub-carrier.

In the Zero Padded OFDM (ZP-OFDM) modulation scheme, as described for example in the article by B. Muquet, Z. Wang, G. B. Giannakis, M. de Courville, and P. Duhamel entitled "Cyclic Prefixing or Zero Padding for Wireless Multicarrier Transmissions" *IEEE Trans. on Communications*, 2002, the cyclic affix is replaced by null samples. This solution relying on a larger FFT demodulator, has the merit to guarantee symbol recovery irrespective of channel null locations when the channel is known.

However channel estimation and tracking remains an issue, especially in the presence of high mobility or high frequency and data rates. Like other digital communication systems, OFDM modulation encounters problems at high Doppler spreads, which occur notably when the user is moving fast, for example in a car, or even at pedestrian speeds when investigating the area of higher frequency bands where more spectrum is available such as the 60 GHz band. Accordingly, the channel impulse response needs to be constantly tracked and updated, especially in the presence of high Doppler spreads.

It would be desirable for the OFDM modulation system to keep all the advantages of classic OFDM and additionally allow very simple and (semi-)blind channel estimation at the receiver. Semi-blind channel estimation means that substantially no additional redundancy is added to the system with respect to classic CP-OFDM, and therefore no bandwidth for data transmission would be lost; however, semi-blind channel estimation can be realized thanks to deterministic sequences known at both the transmitter and the receiver sides, as long as there is no substantial bandwidth loss for data transmission. Such a system would be advantageous in low-mobility scenarios and would make OFDM systems applicable to high-mobility scenarios as well.

Our co-pending European Patent Application EP 02 292 730.5 describes a communication method in which the CP-OFDM time domain redundancy is replaced by a pseudo-randomly weighted deterministic sequence which leads to the so called Pseudo Random Postfix OFDM (PRP-OFDM). The advantages of being able to use ZP-OFDM are preserved and low complexity channel estimation at the receiver is made possible. Note that PRP-OFDM does not impact the achieved useful data rate and spectral efficiency compared to the classical CP-OFDM modulator, apart possibly from transmission of small amounts of data for the calculation of pseudo random parameters, since the only modification is the affix content, thus the low complexity channel estimation possible at the receiver side is also semi-blind.

Our co-pending European Patent Application describes the application of PRP-OFDM to single transmit antenna systems and it is desirable to apply comparable techniques to MTMR systems, capable of using more than one transmit and/or receive antenna.

SUMMARY OF THE INVENTION

The present invention provides a method of communication using Orthogonal Frequency Division Multiplexing, a transmitter and a receiver as described in the accompanying claims.

DETAILED DESCRIPTION OF THE PREFERRED EMBODIMENTS

Figure 1:
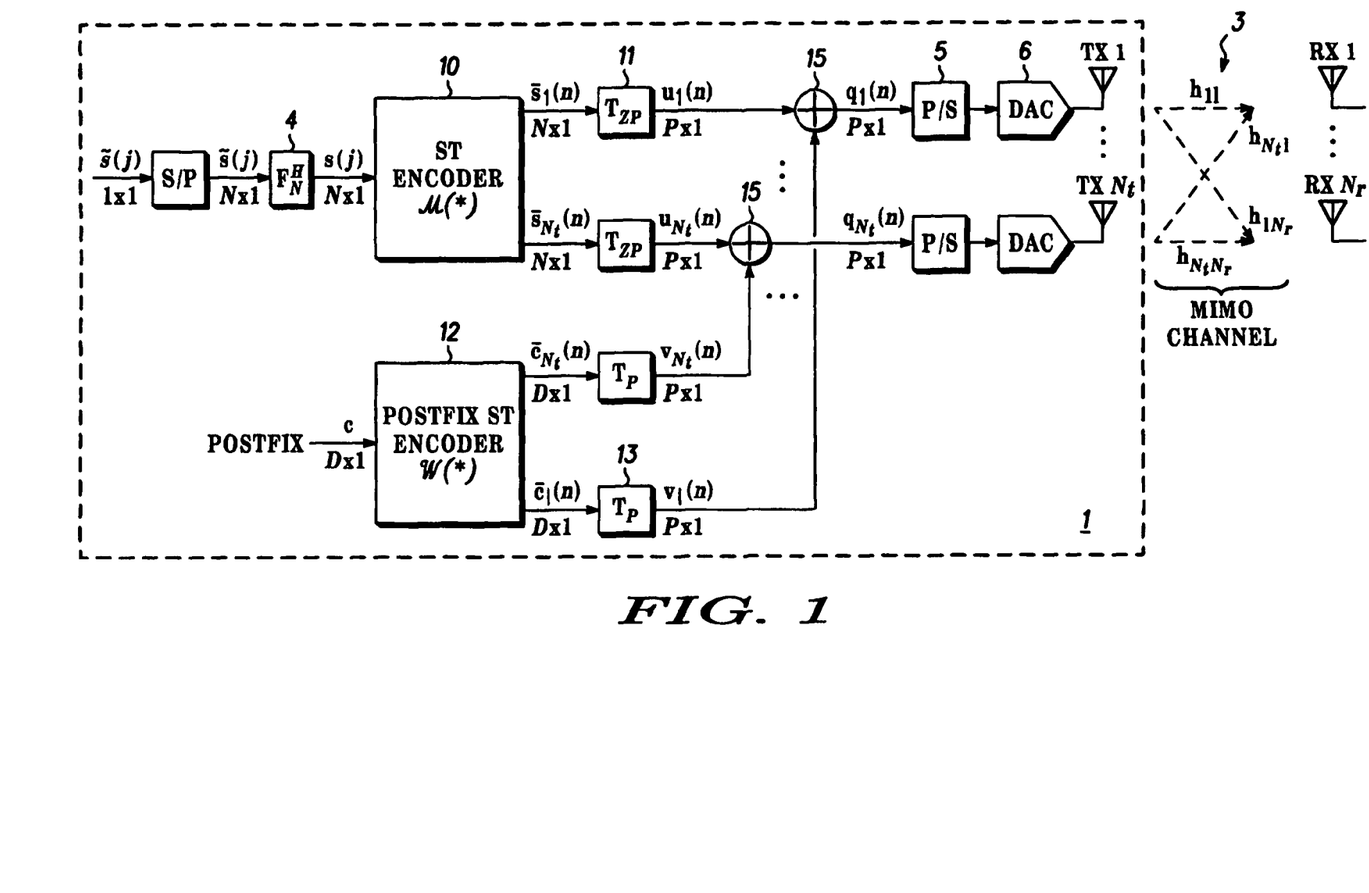
FIG. 1 is a schematic block diagram of a transmitter in a communication system in accordance with one embodiment of the invention, given by way of example.
Figure 2:
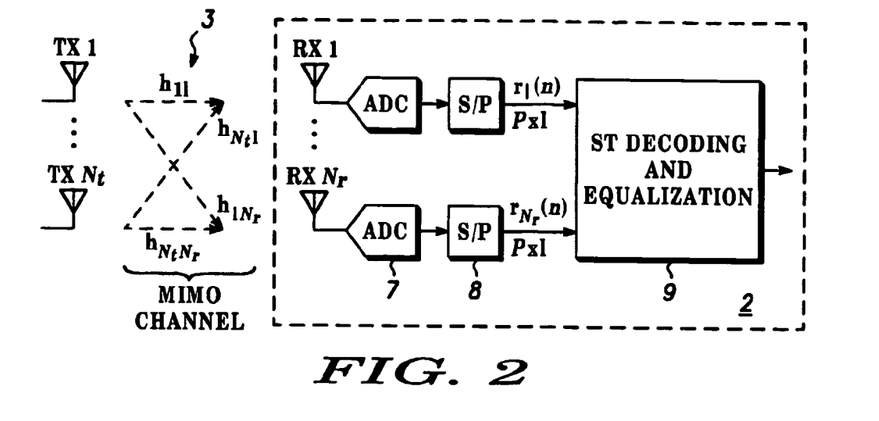
FIG. 2 is a schematic block diagram of a receiver in the communication system whose transmitter is shown in FIG. 1.

FIG. 1 and FIG. 2 show an OFDM communication system in accordance with one embodiment of the invention comprising a transmitter including an OFDM modulator 1 and a receiver including an OFDM demodulator 2, the transmitter and the receiver communicating over a communication channel 3.

The OFDM communication method of this embodiment of the present invention enables estimation and tracking of the Multiple Input Multiple Output ('MIMO') channels in coherent multiple transmit antenna/multiple receive antenna ('MTMR') systems, without any specific limit to the number of transmit (TX) and receive (RX) antennas and without imposing any particular Space-Time Code (STC). Data and affix vectors are independently encoded by two STC and enable a semi-blind estimation of all the MIMO channels exploiting only the order-one statistics of the received signal.

In the following description, lower (upper) boldface symbols will be used for column vectors (matrices) sometimes with subscripts N or P emphasizing their sizes (for square matrices only); tilde ('') will denote frequency domain quantities; argument i will be used to index blocks of symbols; $^H(^T)$ will denote Hermitian (transpose) operations.

FIG. 1 depicts the baseband discrete-time block equivalent model of an N-carrier PRP-OFDM MTMR transceiver with $N_t$ transmit and $N_r$ receive antennae. The communication system is described with reference to Space-Time (ST) block codes ('STBCs') but it will be appreciated that the invention is also applicable to other code systems. In the transmitter, the Initial serial bit stream of constellation symbols $\tilde{s}(jN), \ldots, \tilde{s}(jN+N-1)$ is converted to a set of vectors in a serial-to-parallel converter (not shown); the jth N×1 input digital vector $\tilde{s}(j)$ is then modulated by an Inverse Fast Fourier Transform ('IFFT') matrix $F_N^H$ in a transformer 4, where $$[F_N]_{k,l} = \frac{1}{\sqrt{N}} W_N^{kl}, 0 \le k < N, 0 \le l < N \text{ and } W_N = e^{-j2\pi/N}.$$

The resulting N×1 time domain vector s(j) is processed by a suitable ST encoder matrix $\mathcal{M}$ in an encoder 10, as shown in FIG. 1, creating outputs $\overline{S}(i)=\mathcal{M}$ $(s(iN_t), \ldots, s(iN_t+N_t-1))=\{\overline{s}_l(iM+k), 1\le l\le N_t, 0\le k<M\}$ where i is the block number l is the number of the TX antenna and n=iM+k indexes the outputs in FIG. 1. It will be appreciated that, at least in the context of STBCs, M can differ from $N_t$; In particular, the STBC may lead to rectangular $\overline{S}(i)$, that is to say that $M>N_t$. For the sake of simplicity, we assume in the following description that $\mathcal{M}$ operates on $N_t$ inputs $(s(iN_t), \ldots, s(iN_t+N_t-1))$. However, the invention can be straightforwardly applied to $\mathcal{M}$ with other numbers of inputs. In this embodiment of the invention, the $\overline{s}_l(iM+k)$ are linearly precoded in a precoder 11 by a zero-padded OFDM ('ZP-OFDM') precoding matrix $T_{ZP}$, where $$T_{ZP} = \begin{bmatrix} I_N \\ 0_{D,N} \end{bmatrix}_{P \times N}$$

and $u_l(n) = T_{ZP} \overline{s}_l(n), 1\le l\le N_t$.

The affix contents $v_l(n)$ are added to the data symbols $u_l(n) = T_{ZP}\overline{s}_l(n), 1\le l\le N_t$ resulting in the output vectors $q_l(n)$. The output vectors $q_l(n)$ are converted to a series signal by a parallel-to-series converter 6, a pseudo random postfix being inserted in the signal into guard intervals between each consecutive OFDM symbol to produce a series digital signal $s_l(n)$ on the lth TX atenna. The series digital signal $s_l(n)$ is then converted to an analogue signal $s_l(t)$ by a digital-to-analogue converter 7 and transmitted over the channel 3.

More particularly, in a preferred embodiment of the invention, the postfix that is added in the guard interval comprises a pre-calculated suitable vector that is independent of the data and that is weighted by a first factor $\alpha_k$ and a second factor $w_l(k)$. In one embodiment of the invention, the first factor $\alpha_k$ is different from one time-domain OFDM symbol to another and is known both to the transmitter 1 and to the receiver 2, so that any time domain (cyclo-)stationarity (leading to strong undesired frequency contributions at the repetition frequency) is avoided. In another embodiment of the invention, in which the symbols are coded in blocks, the first factor $\alpha_k$ is different from one time-domain OFDM symbol block to another but is the same for each symbol of the same block. The second factor $w_l(k)$ enables one of the transmit antennas to be distinguished from another.

With an OFDM modulator in the transmitter functioning in this way, semi-blind channel estimation in the receiver can be done simply and at low arithmetical complexity. In particular, the receiver can constantly estimate and track the channel Impulse response without any loss of data bandwidth compared to CP-OFDM, other than the transmission of PR-calculation parameters. Moreover, the demodulator at the receiver can have advantageous characteristics, ranging from very low arithmetical cost (at medium performance) to les low arithmetical cost (with very good system performance).

As described In our copending European Patent Application referred to above for the single antenna case, several choices for the first factor $\alpha_k$ are possible. It is possible to choose $\alpha_k$ of any complex value. However, any $\alpha_k$ with $|\alpha_k|\ne 1$ leads to performance degradation compared to preferred embodiments of the invention.

It is possible to limit the choice of $\alpha_k$, somewhat less generally to a complex value with $|\alpha_k|=1$. This choice usually leads to good system performance, but the decoding process risks to be unnecessarily complex. Preferred values of the first and second factors are described in more detail below.

Preferably, the first factor $\alpha_k$ is pseudo-random. In one embodiment of the present invention the first factor $\alpha_k$ is deterministic and is calculated both by the modulator 1 and the demodulator 2 using the same algorithm and parameters that are stored in memory both in the transmitter and in the receiver. In another embodiment of the present invention, initialisation parameters for the algorithm are transmitted between the transmitter and the receiver to avoid systematically using the same sequence for the first factor $\alpha_k$. In yet another embodiment of the present invention, the first factor $\alpha_k$ is communicated from the transmitter 1 to the receiver 2, which still represents an acceptable overhead in certain circumstances.

Figure 3:
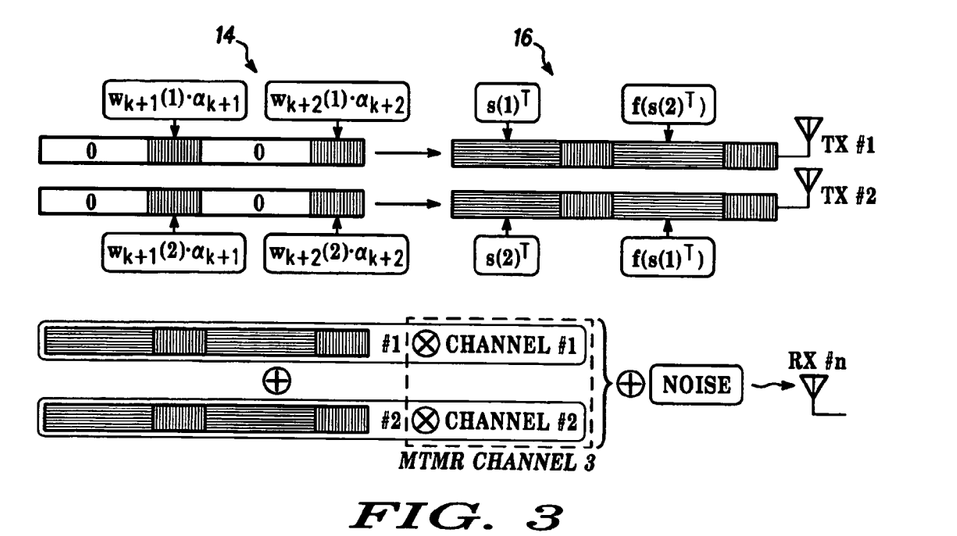
FIG. 3 is a diagram of signals appearing in operation of the modulator of FIG. 2.

In the embodiment of the present invention shown in FIG. 1 and FIG. 2, the affix is deterministic and is a D×1 postfix vector c treated in an encoder 12 by a specific ST encoder matrix $\mathcal{W}$ which outputs the D×1 vectors $\overline{c}_l(n), 1\le l\le N_t$. The way in which $\mathcal{W}$ ensures identification of the complete MIMO channel is described in more detail below. The postfix vectors $\overline{c}_l(n), 1\le l\le N_t$ are then linearly precoded in a precoder 13 by a ZP-OFDM matrix $T_P$, where $$T_P = \begin{bmatrix} 0_{N,D} \\ I_D \end{bmatrix}_{P \times D},$$

to produce zero-padded postfix vectors as shown at 14 in FIG. 3.

The resulting vectors $v_l(n)$ are finally added to the data symbols $u_l(n)$ by adders 15: $q_l(n) = u_l(n) + v_l(n)$, $1 \leq l \leq N_t$ to produce signals 16 for transmission.

The signals received at the receive antennas are the transmitted signals multiplied by the Channel Impulse Response ('CIR') $H_{lm}$ and with the addition of noise and interference $n_m(n)$. Let $H_{lm}$ be a P×P circulant matrix whose first row is given by $[h_{lm}(0), 0, \ldots 0, h_{lm}(L-1), \ldots, h_{lm}(1)]$, where $h_{lm} = [h_{lm}(0), \ldots, h_{lm}(L-1), 0, \ldots 0]^T$ is the P×1 channel impulse response between the lth transmit and the mth receive antennae; D is chosen such that $D \geq L-1$. Define $H_{lm}^{ISI}$ as the lower triangular part of $H_{lm}$ including the main diagonal which represents the Intra-Symbol-Interference (ISI); $H_{lm}^{IBI}$ shall contain the upper triangular part of $H_{lm}$ representing the Inter-Block-Interference (IBI), such that $H_{lm} = H_{lm}^{ISI} + H_{lm}^{IBI}$. Therefore, the received signal vector on the mth antenna, $1 \leq m \leq N_t$, is given by:

$$r_m(n) = \sum_{l=1}^{N_t} [H_{lm}^{ISI} q_l(n) + H_{lm}^{IBI} q_l(n-1)] + n_m(n)$$

where $n_m(n)$ is an zero-mean additive white independent identically distributed gaussian noise term.

As shown in FIG. 2, The demodulator 2 at the receiver comprises an analogue-to-digital converter 7 that converts the signals $r_m(t)$ received at the receive antennas to digital signals, a serial-to-parallel converter 8, which converts the received digital signals to received vectors $r_m(n)$, and a demodulator and equaliser 9 that uses decoding matrices corresponding to the encoding matrices $\mathcal{W}$ and $\mathcal{M}$ to estimate the Channel Impulse Response CIR and demodulate the OFDM signals.

In the following description of the operation of the receiver, an order-one channel estimation algorithm is described first, assuming the channel to be static. Then, the effect of Doppler is introduced for the mobility case and the corresponding channel estimator in the Minimum Mean Square Error (MMSE) sense described.

First the received vector $r_m(n)$ is expressed in an exploitable form for channel estimation. For that purpose, let $H_{lm}^D$ be the D×D circulant matrix of first row $[h_{lm}(0), 0, \ldots 0, h_{lm}(L-1), \ldots, h_{lm}(1)]$. We define $H_{lm}^{ISI,D}$ and $H_{lm}^{IBI,D}$ such that $H_{lm}^D = H_{lm}^{ISI,D} + H_{lm}^{IBI,D}$. The signal $r_m(n)$, received during the nth OFDM symbol on the mth antenna, $1 \leq m \leq N_t$ is equal to:

$$r_m(n) = \sum_{l=1}^{N_t} \begin{bmatrix} H_{lm}^{ISI,D} \bar{s}_{l,0}(n) + H_{lm}^{IBI,D} \bar{c}_l(n-1) \\ \vdots \\ H_{lm}^{IBI,D} \bar{s}_{l,1}(n) + H_{lm}^{ISI,D} \bar{c}_l(n-1) \end{bmatrix} + \begin{bmatrix} n_{m,0}(n) \\ \vdots \\ n_{m,1}(n) \end{bmatrix} \quad \text{Equation 1}$$

where $\bar{s}_{l,0}(n), \bar{s}_{l,1}(n), n_{m,0}(n), n_{m,1}(n)$ are respectively the first D and last D samples of $\bar{s}_l(n)$ and $n_m(n)$.

Equation 1 indicates that a superimposition of the various postfixes convolved by the corresponding channels is interfering with the useful data. An easy independent retrieval of each of the channels based on the sole observation of the postfix contributions is obtained through isolation of each postfix convolved by its related channel. As detailed below, a way to achieve that condition is to perform a Fast Fourier Transform on the postfixes in the demodulator and equaliser 9 using a weighting ST block coding scheme $\mathcal{W}$ of the postfix c according to the following postfix generation process:

$$\begin{bmatrix} \bar{c}_l(iM) & \ldots & \bar{c}_l(iM+M-1) \\ \vdots & \ddots & \vdots \\ \bar{c}_{N_t}(iM) & \ldots & \bar{c}_{N_t}(iM+M-1) \end{bmatrix} = \quad \text{Equation 2}$$

$$\underbrace{\begin{bmatrix} w_l(0)\alpha(iM) & \ldots & w_l(M-1)\alpha(iM+M-1) \\ \vdots & \ddots & \vdots \\ w_{N_t}(0)\alpha(iM) & \ldots & w_{N_t}(M-1)\alpha(iM+M-1) \end{bmatrix}}_{W} \otimes c$$

where $\otimes$ is the Kronecker product and c, $\alpha(n)$ are respectively the deterministic postfix and the pseudo-random weighting factors introduced in our co-pending European Patent Application EP 02 292 730.5 for the single antenna case. The pseudo-random weighting factors $\alpha(n)$ are used to convert the deterministic postfix c into a pseudo-random one. Note that a new set of deterministic weighting factors is introduced, and gathered In the M×N, matrix W corresponding to the matrix W used for encoding the postfixes in the transmitter encoder, with $[W]_{k,l-1} = w_l(k)$, $0 \leq k < M$, $1 \leq l \leq N_t$. W is used to remove the interference between all transmitted postfixes and thus is Invertible in this embodiment of the present invention: full column rank $(\text{rank}(W) = N_t)$. In the following description, we choose W orthogonal for this embodiment of the present invention, such that $W^H W = I_{N_t}$.

With the assumption of a static channel, an order-one channel estimator in the demodulator and equaliser 9 functions as follows. The first and last D samples of $r_m(n)$ are denoted respectively by $r_{m,0}(n)$ and $r_{m,1}(n)$. By setting $n = iM+k$ and assuming the transmitted time domain signal $\bar{s}_l(n)$ to be zero mean for all l, we use Equations 1 and 2 to compute for each k, $0 \leq k < M$, the following D×1 vector:

$$d_m^k(i) = \frac{r_{m,1}(iM+k) + r_{m,0}(iM+k+1)}{\alpha(iM+k)} \quad \text{Equation 3}$$

Next $d_m^k = E[d_m^k(i)]$ is defined as the expectation of $d_m^k(i)$. Due to the deterministic nature of the postfixes, it can be verified from Equation 1 that:

$$d_m^k = \sum_{l=1}^{N_t} [H_{lm}^{ISI,D} + H_{lm}^{IBI,D}] w_l(k) c = \sum_{l=1}^{N_t} H_{lm}^D w_l(k) c \quad \text{Equation 4}$$

Thus the MD×1 vector $d_m = [(d_m^0)^T, \ldots, (d_m^{M-1})^T]^T$ can be expressed for each receive antenna as:

$$d_m = \sum_{l=1}^{N_t} \begin{bmatrix} H_{lm}^D w_l(0) c \\ \vdots \\ H_{lm}^D w_l(M-1) c \end{bmatrix} = (W \otimes I_D) \begin{bmatrix} H_{1m}^D c \\ \vdots \\ H_{N_t,m}^D c \end{bmatrix} \quad \text{Equation 5}$$

Since W is chosen orthogonal, multiplying each $d_m$, $1 \leq m \leq N_t$ by $(W \otimes I_D)^H$ in the demodulator and equaliser 9 removes completely the interference between channel contributions $H_{lm}^D$, $1 \leq l \leq N_t$.

Once the interference between channel contributions is removed the estimation algorithms of the single-antenna case of our co-pending European Patent Application EP 02 292 730.5 can be applied in the demodulator and equaliser 9:

$$H_{lm}^D c = C_D h_{lm}^D = F_D^H \tilde{C}_D F_D h_{lm}^D \quad \text{Equation 6}$$

where $C_D$ is a D×D circulant matrix with the first row [c(0), c(D–1), ..., c(1)], $\tilde{C}_D = \text{diag}\{F_D c\}$, and $h_{lm}^D$ represents the D first coefficients of $h_{lm}$. Hence, the estimate $\hat{h}_{lm}^D$ of the time domain channel impulse response $h_{lm}^D$ in the demodulator and equaliser 9 is obtained by multiplying $H_{lm}^D$ by $F_D^H \tilde{C}_D^{-1} F_D$, $1 \leq l \leq N_t$, $1 \leq m \leq N_r$. Note that $\tilde{C}_D^{-1}$ is a diagonal matrix that is known to both the transmitter and receiver and can thus be precalculated. Subsequently, $h_{lm}^D$ is preferably transformed to the P×1 frequency domain vector $$\hat{h}_{lm} = F_P [I_D^T, 0_{N,D}^T]^T \hat{h}_{lm}^D.$$

This MIMO channel estimation (i.e. estimation of all channels between any transmit and any receive antenna) is used to space-time decode and equalise the received data signals, as described in more detail in examples below, such that the transmitted data signals can be recovered.

The above channel estimator can be extended to further improve reception in mobile environments by using any Doppler model, and by minimizing any performance criterion. An example is now given, in a preferred embodiment of the present invention based on the introduction of a Doppler model; the estimator aims at minimizing the Mean Square Error (MSE).

Figure 4:
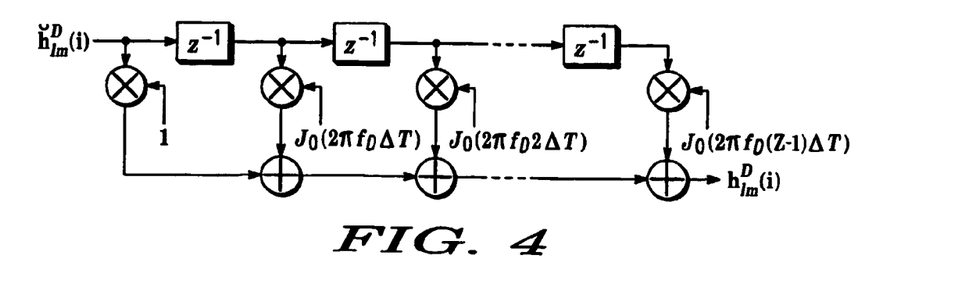
FIG. 4 is a diagram of a moving average Doppler module for the demodulator of FIG. 1.

The Doppler module shown in FIG. 4 is introduced in the demodulator and equaliser 9 to modify the order-one autoregressive model for the Channel Impulse Response ('CIR') between transmit antenna l and receive antenna m separately: $h_{lm}^D(n) = J_0(2\pi f_D \Delta T) h_{lm}^D(n-1) + \check{h}_{lm}^D(n)$ where $J_0(\cdot)$ is the 0th order Bessel function. $f_D$ is the Doppler frequency, $\Delta T$ is the MTMR PRP-OFDM block duration and $\check{h}_{lm}^D(n)$ is zero-mean complex Gaussian of constant variance. The same CIR correlations as the ones provided by the known Jakes model are obtained even in the presence of large Doppler frequencies. This is achieved by forcing the correlation $E[(h_{lm}^D(n))^H h_{lm}^D(k)] = J_0(2\pi f_D(k-n)\Delta T) \forall k > n$. This way the approximation $J_0(2\pi f_D(k-n)\Delta T) = (J_0(2\pi f_D \Delta T))^{(k-n)}$, inherent to the order-one autoregressive estimation, is avoided. This modification leads to the following moving average estimation:

$$h_{lm}^D(n) = \sum_{k=0}^{n} J_0(2\pi f_D k \Delta T) \check{h}_{lm}^D(n-k) \quad \text{Equation 7}$$

As for the order-one autoregressive model, so-called process-noise vectors $\check{h}_{lm}^D(n)$ are introduced assuming $E[\check{h}_{lm}^D(n)(\check{h}_{lm}^D(n))^H] = 0$ for $n \neq k$ and $\check{h}_{lm}^D(0) = h_{lm}^D(0)$ being the CIR to be estimated. Assuming that CIR $h_{lm}^D(n)$ is estimated based on Z noisy observations $\bar{d}_{lm}(i) = \{d_{lm}(k), i \leq k < i+Z\}$, the expression $\bar{d}_{lm}(i) = \lfloor (W \otimes I_D)^H d_m(i) \rfloor_k$, $(l–1)D \leq k > lD$ results from the convolution of the lth block postfix by channel $h_{lm}^D(n)$ corrupted both by thermal noise and the OFDM data symbols. The OFDM data symbols are assumed zero-mean and independent of same variance as the postfix samples. $d_m(i) = [(d_m^0(i))^T, ..., (d_m^{M-1}(i))^T]^T$ contains the received symbols after equalization of the pseudo random weighting factor of the postfixes (Equation 3). Thus, $\bar{d}_{lm}(i)$ can be expressed as follows:

$$\bar{d}_{lm}(i) = (J \otimes C_D) \begin{bmatrix} \check{h}_{lm}^D(0) \\ \check{h}_{lm}^D(1) \\ \vdots \\ \check{h}_{lm}^D(Z-1) \end{bmatrix} + n, \text{ where} \quad \text{Equation 8}$$

$$J = \begin{bmatrix} 1 & 0 & \cdots & 0 \\ J_0(2\pi f_D \Delta T) & 1 & \ddots & 0 \\ \vdots & & \ddots & \vdots \\ J_0(2\pi f_D(Z-1)\Delta T) & J_0(2\pi f_D(Z-2)\Delta T) & \cdots & 1 \end{bmatrix}$$

where n gathers the thermal noise and the interference from the OFDM data symbols. In order to guarantee the unit variance of each channel realisation, the norm of $\check{h}_{lm}^D(n)$, $n = 0, ..., Z-1$ is chosen such that:

$$\sum_{n=0}^{Z-1} [J]_{k,n}^2 E\left[\left(\check{h}_{lm}^D(n)\right)^H \check{h}_{lm}^D(n)\right] = 1, k = 0, ..., Z-1. \quad \text{Equation 9}$$

It can thus be verified that the optimum estimator of $h_{lm}^D(0) = \check{h}_{lm}^D(0)$ in the MMSE sense is given from Equation 8 by:

$$\hat{h}_{lm}^D(i) = M[(J \otimes C_D) D_{R_h} (J \otimes C_D)^H + R_n]^{-1} \bar{d}_m(i) \quad \text{Equation 10}$$

with:

$$D_{R_h} = \text{diag}\left\{R_{\check{h}_{lm}(0)}, ..., R_{\check{h}_{lm}(Z-1)}\right\},$$

$$M = [1, ..., J_0(2\pi f_D(Z-1)\Delta T)] \otimes \left(R_{\check{h}_{lm}(0)} C_D^H\right)$$

and $R_a = E[a a^H]$ is the auto-correlation matrix of the vector a.

Since in practice the channel power profile is usually not known, in that case the assumption is made that $$R_{\check{h}_{lm}(n)} \approx g_n I_D$$

for all n. The real gain $g_n$ is introduced for respecting the power constraints of Equation 9.

The above description presents generic channel estimation in the demodulator and equaliser 9 in accordance with embodiments of the present invention for both relatively static and high mobility environments. Their use for two STBC systems will now be described.

The first embodiment of STBC is based on ZP-OFDM decoding. The system includes modulators using pseudo-random postfixes at the transmitter and also equalizer structures derived for the MTMR case from those described for the Single Transmit Single Receive (STSR) case in our co-pending European Patent Application EP 02 292 730.5 based on the transformation of the received PRP-OFDM vector to the ZP-OFDM case. The system is described for the case of $N_t=2$ transit and $N_r=1$ receive antennas, although it will be appreciated that the system is applicable to other numbers of antennas. The ST encoder operates over $N_t \times M$ vectors with $N_t=M=2$. Since $N_r=1$, the subscript $1 \leq m \leq N_r$ is not used in the following analysis. Perfect knowledge of the channels $h_l$, $1 \leq l \leq N_t$ is assumed but it will be appreciated that the system is capable of working with imperfect channel knowledge.

At the transmitter, a 2×1 ZP-ST encoder $\mathcal{M}$ is used, which takes two consecutive OFDM symbols $s(2i)$ and $s(2i+1)$ to form the following coded matrix:

$$\begin{bmatrix} \tilde{s}_1(2i) & \tilde{s}_1(2i+1) \\ \tilde{s}_2(2i) & \tilde{s}_2(2i+1) \end{bmatrix} = \begin{bmatrix} s(2i) & -P_N^0 s^*(2i+1) \\ s(2i+1) & P_N^0 s^*(2i) \end{bmatrix} \quad \text{Equation 11}$$

where the permutation matrices $P_J^n$ are such that, for a J×1 vector $a=[\alpha(0), \ldots, \alpha(J-1)]^T$, we have $\{P_N^0 a\}_p = \alpha((J-p+n) \mod J)$.

Since the channel has been estimated, as for the single antenna case described in our co-pending European Patent Application, it is always possible to retrieve the MTMR ZP-OFDM signals from Equation 1 by subtracting from the received signal the known PRP contribution:

$$r^{ZP}(n) = r(n) - \sum_{l=1}^{2} [H_l^{IBI} v_l(n-1) + H_l^{ISI} v_l(n)] \quad \text{Equation 12}$$

which leads to $$r^{ZP}(n) = \sum_{l=1}^{2} H_l T_{ZP} \tilde{s}_l(n).$$

Note that i) no constraint has to be set on W for the symbol recovery, ii) the PRP interference cancellation procedure proposed is generic and can be applied to any suitable ST encoder $\mathcal{M}$.

A suitable detection algorithm is applied to the signal described by Equation 12 by the demodulator and equaliser 9. Noticing that $P_P^N T_{ZP} = T_{ZP} P_N^0$, we denote by $\tilde{D}_1 = \text{diag}\{\tilde{h}_1\}$, $\tilde{D}_1 = \text{diag}\{\tilde{h}_1\}$, $\tilde{n}(2i) = F_P n(2i)$ and $\tilde{n}(2i+1) = F_P P_P^N n^*(2i+1)$; then if we switch to the frequency domain by computing $\tilde{y}(2i) = F_P r^{ZP}(2i)$ and $\tilde{y}(2i+1) = F_P (P_P^N r^{ZP}(2i+1))^*$, exploiting the fact that $H_l = F_P^H \tilde{D}_l F_P$, $1 \leq l \leq 2$, we can write:

$$\begin{bmatrix} \tilde{y}(2i) \\ \tilde{y}(2i+1) \end{bmatrix} = \underbrace{\begin{bmatrix} \tilde{D}_1 & \tilde{D}_2 \\ \tilde{D}_2^* & -\tilde{D}_1^* \end{bmatrix}}_{=\tilde{D}} \begin{bmatrix} F_P T_{ZP} s(2i) \\ F_P T_{ZP} s(2i+1) \end{bmatrix} + \begin{bmatrix} \tilde{n}(2i) \\ \tilde{n}(2i+1) \end{bmatrix} \quad \text{Equation 13}$$

where $\tilde{D}$ is an orthogonal channel matrix. Thus multiplying $[\tilde{y}(2i)^T \tilde{y}(2i+1)^T]^T$ by $\tilde{D}^H$ achieves the separation of the transmitted signals $s(2i)$ and $s(2i+1)$, and it can be shown that full transmit diversity is achieved. Note that the separation of signals allows the same equalisation schemes to be used in this embodiment of the present invention as in the single-antenna case described in our co-pending European Patent Application EP 02 292 730.5.

The second embodiment of STBC system is based on equalization of the full received block by diagonalisation of pseudo-circulant channel matrices. The ST data encoder $\mathcal{M}$ used in the demodulator and equaliser 9 is based on a version of the single antenna system described in our co-pending European Patent Application EP 02 292 730.5 modified to enable the equalization structure that is detailed below and outputs blocks $N_t \times M$ vectors with $N_t=M=2$. $\mathcal{M}$ and $\mathcal{W}$ are specified such that they generate the following matrix $Q(i) = \{q_l(2i+k), 1 \leq l \leq 2, 0 \leq k < 2\}$ at the antenna outputs:

$$Q(i) = \begin{bmatrix} \begin{bmatrix} s(2i) \\ \alpha(2i)c \end{bmatrix} & -P_P^0 Q_{\beta(i)} \begin{bmatrix} s^*(2i+1) \\ \alpha(2i+1)c^* \end{bmatrix} \\ \begin{bmatrix} s(2i+1) \\ \alpha(2i)c \end{bmatrix} & P_P^0 Q_{\beta(i)} \begin{bmatrix} s^*(2i) \\ \alpha(2i+1)c^* \end{bmatrix} \end{bmatrix} \quad \text{Equation 14}$$

$P_P^0$ being a permutation matrix defined as previously (inversing the order of the vector elements), $\alpha(i)$ is complex with $|\alpha(i)|=1$ being pseudo-random complex weighting factors as defined in our co-pending European Patent Application for the single antenna case with $\alpha(2i+1) = \beta^2(i)\alpha(2i)$, and $\beta(i) = \alpha(2i=2)/\alpha(2i)$. $Q_{\beta(i)}$ is defined as:

$$Q_{\beta(i)} = \begin{bmatrix} 0_{D \times N} & \beta(i) \cdot I_D \\ I_N & 0_{N \times D} \end{bmatrix}.$$

The D×1 postfix c is chosen such that it has Hermitian symmetry, that is to say that the complex conjugate of the vector read backwards is equal to the original c. As in our co-pending European Patent Application, the channels are represented by P×P pseudo-circulated channel matrices $H_l^{\beta(i)}$, $1 \leq l \leq 2$. These are identical to standard circulant convolution matrices with the upper triangular part multiplied by the scalar factor $\beta(i)$, in other words $H_l^{\beta(i)} = H_l^{ISI} + \beta(i) H_l^{IBI}$.

With $R(i) = [r^T(2i) r^T(2i+1)]^T$ and the noise matrix $N(i) = [n^T(2i) n^T(2i+1)]^T$, the received signals over M=2 symbol times are given as follows:

$$R(i) = \begin{bmatrix} \sum_{l=1}^{2} [H_l^{IBI} q_l(2i-1) + H_l^{ISI} q_l(2i)] \\ \sum_{l=1}^{2} [H_l^{IBI} q_l(2i) + H_l^{ISI} q_l(2i+1)] \end{bmatrix} + N(i)$$

With $\hat{R}(i) = [\hat{r}^T(2i) \hat{r}^T(2i+1)]^T$, the following operations are performed at the demodulator and equaliser 9 on the received vectors:

$$\hat{R}(i) = \begin{bmatrix} r(2i) + 2c_1^{\beta(i)}(i) \\ Q_{\beta(i)}^H (P_P^0 (r(2i+1) + 2c_2^{\beta(i)}(i)))^* \end{bmatrix}$$

$$= \underbrace{\begin{bmatrix} H_1^{\beta(i)} & H_2^{\beta(i)} \\ (H_2^{\beta(i)})^H & -(H_1^{\beta(i)})^H \end{bmatrix}}_{=W_H(i)} \begin{bmatrix} \begin{bmatrix} s(2i) \\ \alpha(2i)c \end{bmatrix} \\ \begin{bmatrix} s(2i+1) \\ \alpha(2i)c \end{bmatrix} \end{bmatrix}$$

-continued where $$c_1^{\beta(i)}(i) = \alpha(2i)\beta(i)H_1^{|Bl|}T_{PC},$$

$$c_2^{\beta(i)}(i) = -[2\Re\{\alpha(2i)\}H_1^{|Bl|} + 2\Im\{\alpha(2i)\}H_2^{|Bl|}]T_{PC}.$$

In this embodiment of STBC system, the data symbols are separated in the demodulator and equaliser 9 by premultiplication of $\hat{R}(i)$ by the Hermitian of the upper channel matrix $W_H(i)$:

$$W_H(i)\hat{R}(i) = \begin{bmatrix} H^{\beta(i)} & 0_{P\times P} \\ 0_{P\times P} & H^{\beta(i)} \end{bmatrix} \begin{bmatrix} \begin{bmatrix} s(2i) \\ \alpha(2i)c \end{bmatrix} \\ \begin{bmatrix} s(2i+1) \\ \alpha(2i)c \end{bmatrix} \end{bmatrix}$$

with $H^{\beta(i)} = H_1^{\beta(i)}(H_1^{\beta(i)})^H + H_2^{\beta(i)}(H_2^{\beta(i)})^H$. The equalisation based on pseudo circulant channel matrices is then performed as presented in our co-pending European Patent Application for the single channel case. The PRP-OFDM postfix based blind channel estimation is performed based on R(i) as presented above.

The invention claimed is:

1. A method of communication using Orthogonal Frequency Division Multiplexing ('OFDM') from a transmitter comprising a plurality of transmit antenna means and a receiver comprising at least one receive antenna means, the method comprising:
   generating bit streams and corresponding sets of N frequency domain carrier amplitudes ($\tilde{s}(kN+j)$, $0 \leq j \leq N-1$) modulated as OFDM symbols subsequently to be transmitted from the transmitter, where k is the OFDM symbol number and j indicates the corresponding OFDM carrier number;
   inserting affix information into guard intervals between consecutive time domain OFDM symbols;
   transmitting said time domain OFDM symbols including said affix information from said transmitter to said receiver;
   using said affix information at the receiver to estimate the Channel Impulse Responses ($H_{lm}$ between the lth transmit and mth receive antenna) of the transmission channels between said transmitter and said receiver; and
   using the estimated Channel Impulse Response ($\hat{H}_{lm}$ between the lth transmit and mth receive antenna) to demodulate said bit streams in the signals received at said receiver, wherein said affix information is known to said receiver as well as to said transmitter, and is mathematically equivalent to a vector ($c_D$) that is common to said time domain OFDM symbols multiplied by at least first weighting factors ($\alpha_k$) that are different for one time domain OFDM symbol (k) than for another and second weighting factors ($w_i(k)$) that enable one of said transmit antenna means (i) to be distinguished from another;
   wherein said transmitter uses $N_t$ transmit antenna means and the receiver uses $N_r$ receive antenna means, M' consecutive time domain OFDM data symbols are encoded by a specific space-time encoder M such that the encoder M produces M time domain OFDM data signals outputs for each of the $N_t$ transmit antenna means, and said vector ($c_D$) is encoded by a specific space-time encoder W such that the encoder W produces M affixes for each of the $N_t$ transmit antenna means corresponding to said affix information weighted by said first and second weighting factors ($\alpha_k$) and $w_i(k)$, the resulting affixes being inserted between time domain OFDM data symbols for each of the $N_t$ transmit antenna means.

2. A method of communication as claimed in claim 1, wherein said first weighting factors ($\alpha_k$) have pseudo-random values.

3. A method of communication as claimed in claim 1, wherein said first weighting factors ($\alpha_k$) have complex values.

4. A method of communication as claimed in claim 1, wherein said first weighting factors ($\alpha_k$) are deterministic and are known to said receiver as well as to said transmitter independently of current communication between said receiver and said transmitter.

5. A method of communication as claimed in claim 1, wherein said first weighting factors ($\alpha_k$) are communicated from said transmitter to said receiver.

6. A method of communication as claimed in claim 1, wherein the matrix of said second weighting factors ($w_i(k)$) for said transmit antenna means and for a number $N_t$ of consecutive symbols equal to the transmit antenna means is a non-orthogonal matrix (W) such that when multiplied by its complex conjugate transpose $((W)^T)^*$ the result is different from the identity matrix (I), weighted by a gain factor $g_0$ having a non-zero real value (i.e. $g_0 I \neq W^H W$).

7. A method of communication as claimed in claim 1, wherein all transmit antenna outputs over M consecutive OFDM time domain symbols, including time domain OFDM data symbols space-time encoded by M and pseudo-random affixes space-time encoded by W, are grouped into a block S, for which said first weighting factors ($\alpha_k$) are the same for OFDM symbols of the same block S but are different for OFDM symbols of different block S.

8. A method of communication as claimed in claim 7, wherein said transmitted affixes enable the separation at said receiver of the transmitted guard interval affix information of said block S, and said second weighting factors ($w_i(k)$) enable the separation and estimation at said receiver of the different physical channels between said transmit antenna means and said at least one receive antenna means.

9. A method of communication as claimed in claim 8, wherein demodulating said bit streams includes, for each said receive antenna means, multiplying a signal derived from the received signal $d_m$ by the complex conjugate transpose of the Kronecker product of said matrix of said second weighting factors ($w_i(k)$) for said transmit antenna means by the identity matrix $((W \times I_D)^H)$ and using channel estimates derived form the results in demodulating said bit streams.

10. A method of communication as claimed in claim 9, wherein the matrix of said second weighting factors ($w_i(k)$) for said transmit antenna means and for a number $N_t$ of consecutive symbols equal to the number $N_t$ of said transmit antenna means is a matrix (W) such that (W) alone is non-orthogonal, but (W) combined with the corresponding pseudo-random factors ($\alpha_k$) is orthogonal.

11. A method of claim 1, wherein the matrix W corresponding to $M \times N_t$ of said second weighting factors ($w_i(k)$) for a number M of consecutive symbols and for said $N_t$ transmit antenna means is an orthogonal matrix such that when multiplied by its complex conjugate transpose $((W)^T)^*$ the result is the identity matrix (I), weighted by a gain factor $g_0$ having a non-zero real value (i.e. $g_0 I = W^H W$).

12. A method of claim 1, wherein said second weighting factors ($w_i(k)$) take different values for each of said transmit antenna means so as to enable said physical channels to be distinguished.

13. A method of claim 1, wherein estimating the Channel Impulse Response ($H_{lm}$) of the transmission channels between said transmitter and said receiver comprises a step of making a moving average estimation over a plurality of symbol periods of channels which are mathematically equivalent to the relationship:

$$h_{lm}^D(n) = \sum_{k=0}^{n} J_0(2\pi f_D k \Delta T) \tilde{h}_{lm}^D(n-k) \qquad 5$$

where $J_0(\cdot)$ is the oth order Bessel function, $f_D$ is the Doppler frequency, $\Delta T$ is the MTMR PRP-OFDM block duration and $\tilde{h}_{lm}^D(n)$ is zero-mean complex Gaussian of constant variance.

* * * * *

UNITED STATES PATENT AND TRADEMARK OFFICE
CERTIFICATE OF CORRECTION

PATENT NO. : 7,539,259 B2  
APPLICATION NO. : 10/566932  
DATED : May 26, 2009  
INVENTOR(S) : Dias et al.

It is certified that error appears in the above-identified patent and that said Letters Patent is hereby corrected as shown below:

IN THE SPECIFICATION

1. In Column 3, Line 29, delete "('')" and insert -- ('~') --, therefor.

2. In Column 3, Line 38, delete "Initial" and insert -- initial --, therefor.

3. In Column 4, Line 28, delete "Impulse" and insert -- impulse --, therefor.

4. In Column 4, Line 33, delete "In" and insert -- in --, therefor.

5. In Column 6, Line 24, delete "In" and insert -- in --, therefor.

6. In Column 6, Line 26, delete "$[W]_{k,t-1}$" and insert -- $[W]_{k,l-1}$ --, therefor.

7. In Column 6, Line 28, delete "Invertible" and insert -- invertible --, therefor.

8. In Column 7, Line 41, delete "function." and insert -- function, --, therefor.

9. In Column 7, Line 63, delete "k>ID" and insert -- k<ID --, therefor.

10. In Column 8, Line 51, delete "$R_{\bar{h}^0_{bm}}(n)$" and insert -- $R_{h_{lm}(n)}\_D$ --, therefor.

11. In Column 9, Line 3, delete "transit" and insert -- transmit --, therefor.

12. In Column 9, Line 8, delete "$I \leq l \leq N_t$" and insert -- $1 \leq l \leq N_t$ --, therefor.

13. In Column 9, Line 52, delete "$\tilde{y}(2i+1)-\bar{F}_P(P_P^N r^{ZP}(2i+1))^n$" and insert -- $\tilde{y}(2i+1) = F_P(P_P^N r^{ZP}(2i+1))^r$ --, therefor.

14. In Column 10, Line 34, after "postfix" insert -- vector --.

15. In Column 10, Line 38, delete "pseudo-circulated" and insert -- pseudo-circulant --, therefor.

16. In Column 10, Line 38-39, delete "$H_1^\beta{}_{(i)},$" and insert -- $H_1^{\beta(i)},$ --, therefor.

CERTIFICATE OF CORRECTION (continued)
U.S. Pat. No. 7,539,259 B2

IN THE CLAIMS

17. In Column 12, Line 20, in Claim 6, delete "to the transmit" and insert -- to the number $N_t$ of said transmit --, therefor.

18. In Column 14, Line 1, in Claim 13, delete "oth" and insert -- 0th --, therefor.

Signed and Sealed this

Ninth Day of February, 2010

David J. Kappos
*Director of the United States Patent and Trademark Office*